(12) United States Patent
Gondo et al.

(10) Patent No.: US 9,191,158 B2
(45) Date of Patent: Nov. 17, 2015

(54) COMMUNICATION APPARATUS, COMMUNICATION METHOD AND COMPUTER READABLE MEDIUM

(75) Inventors: Shunichi Gondo, Tokyo (JP); Daisuke Ajitomi, Yokohama (JP); Yuji Irie, Kawasaki (JP); Shigeo Matsuzawa, Chofu (JP); Kotaro Ise, Saitama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1397 days.

(21) Appl. No.: 11/928,653

(22) Filed: Oct. 30, 2007

(65) Prior Publication Data

US 2008/0222494 A1 Sep. 11, 2008

(30) Foreign Application Priority Data

Nov. 17, 2006 (JP) ................................ 2006-311498

(51) Int. Cl.
  *H03M 13/00* (2006.01)
  *H04L 1/18* (2006.01)
  *H04L 1/00* (2006.01)

(52) U.S. Cl.
  CPC ............ *H04L 1/1835* (2013.01); *H04L 1/0045* (2013.01); *H04L 1/0057* (2013.01); *H04L 1/1819* (2013.01); *H04L 1/1845* (2013.01)

(58) Field of Classification Search
  CPC .... H04L 1/1835; H04L 1/1819; H04L 1/1845
  USPC .................................................. 714/776, 766
  See application file for complete search history.

(56) References Cited

U.S. PATENT DOCUMENTS

| 5,243,596 | A | * | 9/1993 | Port et al. ....................... 370/231 |
| 5,600,663 | A | * | 2/1997 | Ayanoglu et al. ............. 714/774 |
| 6,000,053 | A | * | 12/1999 | Levine et al. .................. 714/766 |

(Continued)

FOREIGN PATENT DOCUMENTS

| EP | 1 180 282 A1 | 2/2002 |
| JP | 2006-067072 | 3/2006 |

(Continued)

OTHER PUBLICATIONS

J. Rosenbert, et al., "Request for Comments: 2733, An RTP Payload Format for Generic Forward Error Correction", Network Working Group, Dec. 1999, pp. 1-26.

(Continued)

*Primary Examiner* — Joseph D Torres
(74) *Attorney, Agent, or Firm* — Oblon, McClelland, Maier & Neustadt, L.L.P.

(57) ABSTRACT

There is provided with a communication method including: attempting to receive a media packet from a network; storing a received media packet in a first buffering unit; receiving an FEC packet including redundant data to recover a lost media packet and information which specifies a plurality of media packets associated with the redundant data; storing a received FEC packet in a second buffering unit; selecting the FEC packet from the second buffering unit; dividing FEC operation processing to be carried out using the redundant data included in selected FEC packet and the media packets related to the redundant data into a plurality of processes and sequentially carrying out each process so that one process is carried out every time the receiving of a media packet is attempted; and inserting a media packet recovered through the FEC operation processing in the first buffering unit.

9 Claims, 5 Drawing Sheets

(56) References Cited

U.S. PATENT DOCUMENTS

| | | | | |
|---|---|---|---|---|
| 6,079,042 | A * | 6/2000 | Vaman et al. | 714/755 |
| 6,081,907 | A * | 6/2000 | Witty et al. | 714/6.1 |
| 6,141,788 | A * | 10/2000 | Rosenberg et al. | 714/774 |
| 6,145,109 | A * | 11/2000 | Schuster et al. | 714/752 |
| 6,243,846 | B1 * | 6/2001 | Schuster et al. | 714/776 |
| 6,363,425 | B1 * | 3/2002 | Hook et al. | 709/226 |
| 6,430,233 | B1 * | 8/2002 | Dillon et al. | 375/316 |
| 6,445,717 | B1 * | 9/2002 | Gibson et al. | 370/473 |
| 6,473,875 | B1 * | 10/2002 | Anderson | 714/746 |
| 6,490,705 | B1 * | 12/2002 | Boyce | 714/776 |
| 6,516,435 | B1 * | 2/2003 | Tsunoda | 714/751 |
| 6,532,562 | B1 * | 3/2003 | Chou et al. | 714/776 |
| 6,594,798 | B1 * | 7/2003 | Chou et al. | 714/820 |
| 6,675,340 | B1 * | 1/2004 | Hardie et al. | 714/751 |
| 6,732,314 | B1 * | 5/2004 | Borella et al. | 714/752 |
| 6,745,364 | B2 * | 6/2004 | Bhatt et al. | 714/774 |
| 6,771,674 | B1 * | 8/2004 | Schuster et al. | 370/537 |
| 6,851,084 | B2 * | 2/2005 | Pattavina | 714/776 |
| 6,895,019 | B2 * | 5/2005 | Gibson et al. | 370/473 |
| 6,996,097 | B1 * | 2/2006 | Chou et al. | 370/389 |
| 7,016,327 | B2 * | 3/2006 | Grilli et al. | 370/331 |
| 7,020,109 | B2 * | 3/2006 | Grilli et al. | 370/331 |
| 7,085,282 | B2 * | 8/2006 | Belotserkovsky et al. | 370/442 |
| 7,095,729 | B2 * | 8/2006 | Sachs et al. | 370/341 |
| 7,151,754 | B1 * | 12/2006 | Boyce et al. | 370/328 |
| 7,224,702 | B2 * | 5/2007 | Lee | 370/473 |
| 7,320,099 | B2 * | 1/2008 | Miura et al. | 714/748 |
| 7,328,393 | B2 * | 2/2008 | Chawla et al. | 714/774 |
| 7,366,172 | B2 * | 4/2008 | Chou et al. | 370/389 |
| 7,443,797 | B2 * | 10/2008 | Cheung et al. | 370/236 |
| 7,447,148 | B2 * | 11/2008 | Gao et al. | 370/216 |
| 7,539,925 | B2 * | 5/2009 | Yamane | 714/774 |
| 7,577,898 | B2 * | 8/2009 | Costa et al. | 714/776 |
| 7,643,452 | B2 * | 1/2010 | Grilli et al. | 370/331 |
| 7,675,944 | B2 * | 3/2010 | Grilli et al. | 370/503 |
| 7,697,514 | B2 * | 4/2010 | Chou et al. | 370/389 |
| 7,787,389 | B2 * | 8/2010 | Chen et al. | 370/252 |
| 7,849,384 | B2 * | 12/2010 | Costa et al. | 714/776 |
| 7,899,038 | B2 * | 3/2011 | Ulybin | 370/353 |
| 7,904,781 | B2 * | 3/2011 | Sugai et al. | 714/752 |
| 2003/0226092 | A1 | 12/2003 | Kim et al. | |
| 2007/0300134 | A1 | 12/2007 | Sugai et al. | |

FOREIGN PATENT DOCUMENTS

| | | |
|---|---|---|
| WO | WO 01/74012 A1 | 10/2001 |
| WO | WO 2005/086436 A1 | 9/2005 |
| WO | WO 2006/061902 A1 | 6/2006 |

OTHER PUBLICATIONS

"Transmission of Professional MPEG-2 Transport Streams over IP Networks", Pro-MPEG Code of Practice #3 release 2, Pro-MPEG Forum, Jul. 2004, pp. 1-17.

Extended Search Report issued Dec. 2, 2010 in EP Application No. 07254317.6.

* cited by examiner

COMMUNICATION APPARATUS, COMMUNICATION METHOD AND COMPUTER READABLE MEDIUM

CROSS- REFERENCE TO RELATED APPLICATIONS

This application is based upon and claims the benefit of priority from the prior Japanese Patent Applications No. 2006-311498 led on Nov. 17, 2006, the entire contents of which are incorporated herein by reference.

BACKGROUND OF THE INVENTION

1. Field of the Invention

The present invention relates to a communication apparatus, communication method and a computer readable medium.

2. Related Art

RTP (Real-Time Transport Protocol) is a transmission protocol capable of including additional information such as a reception sequence, reception timing necessary for real-time streaming which is not transmitted by UDP (User Datagram Protocol) alone along with each transmission data packet, and is a transmission protocol that executes reception processing based on the additional information at the time of reception and can receive necessary data at necessary timing in the same condition as that at the time of transmission. RTP allows the receiving side to correct sequence errors and variations in transmission intervals among packets which occur on the Internet and discard extremely delayed packets and detect lost packets.

On the other hand, since RTP is a transmission protocol based on UDP which is a higher protocol inheriting the original best-effort characteristic of IP (Internet Protocol) which is a transmission protocol making up the Internet and since RTP alone provides no measures for loss of transmission data, it is necessary to complement data loss by additional way and retransmission control and error correction exist as techniques for this purpose.

FEC (Forward Error Correction) or the like is generally known as a specific technique of error correction.

According to FEC, the transmitting side groups original data, carries out calculations using a predetermined technique, thereby generates redundant data for each group and transmits the redundant data in parallel with data of each group. When part of data is lost within each group, on the receiving side the lost data can be recovered by carrying out calculations from the received remaining data and redundant data using a predetermined technique.

There is a scheme defined by RFC2733 as an FEC scheme applicable to RTP.

Conventional RFC2733-based FEC for RTP is designed targeted at extremely rare packet loss on a network which is considered to have high quality in the first place and is known to have a problem that its resistance to consecutive burst losses is weak. This is because its achievable recovery performance is limited to those calculable among 24 consecutive packets and if exclusive OR is adopted as the calculation technique, recovery is limited to loss of one packet at most and attempting to realize higher recovery performance increases the degree of redundancy, resulting in an increased bandwidth and this is not realistic. Therefore, the conventional FEC scheme is effective only for discrete losses but the conventional FEC scheme has no effect on burst losses which are known to frequently occur on the Internet. On the other hand, burst losses which cannot be handled by conventional FEC are considered to require handling through retransmission using a scheme such as ARQ (Automatic Repeat reQuest) rather than extremely increasing the degree of redundancy. However, ARQ has various problems such as instability of communication bandwidth used and excessive increase of delays and involves considerable side effects in real-time streaming transmission.

However, when real-time streaming transmission results in a high bit rate, this means that the number of packets transmitted within a unit time increases and when the time during which trouble occurs is the same, the number of packets affected within the unit time is one at most in the case of a low bit rate, whereas a plurality of packets are affected in the case of a high bit rate and the number of burst losses may increase consequently. Therefore, even on a network of high quality to a certain degree, losses which have been discrete so far tend to turn into burst losses and techniques for increasing the number of bursts that can be coped with by FEC have been proposed so as to make FEC applicable to such a case, too.

One such technique is an FEC scheme accompanied by matrix formation adopted also in a Pro-MPEG (Moving Picture Experts Group) scheme. This is a scheme in which when forming an FEC group, a plurality of packets to be calculated are arranged in a square form and grouped on rows and columns. Since rows are aligned in the packet sequence, columns perpendicular to the sequence are equivalent to discretely selected ones, and even when packets are lost in a burst-like fashion on rows, a calculation group to which each packet belongs differs from each other, and therefore calculations can be carried out for each column and when only a single row is lost, the loss can be handled as a discrete loss when viewed from the column. In this way, the matrix formation can simply, efficiently and explicitly realize packet rearrangement (interleaving) which is considered to be effective for burst loss and changing the vertical/horizontal length of the matrix can flexibly change error resistance of FEC.

Furthermore, when losses cannot be recovered by only calculations on the column group, more losses can be handled by combining the recovery on the column group with the recovery through calculations on the row group and repeating calculations on columns and rows.

In this way, the matrix formation allows resistance to burst losses which is considered to be a weak point in the conventional FEC scheme to be reinforced.

Incidentally, as references in the background, there are J. Rosenberg et al., "RFC2733 An RTP Payload Format for Generic Forward Error Correction" IETF, December 1999 and "Pro-MPEG Code of Practice #3 release 2", Pro-MPEG Forum, July 2004

However, since the FEC scheme of RTP considers that it is all right to start recovery processing when a packet loss is detected, when a burst loss occurs in the FEC scheme accompanied by matrix formation, there is a problem that the operation processing outstandingly increases temporarily at the time when recovery operation occurs.

That is, when all row packets in a certain matrix are lost in a burst-like fashion, a number of packets resulting from multiplying the number of column packets by the number of row packets, that is, the number of packets corresponding to the matrix size is the number of packets to be calculated. When all packets on a row are lost in a burst-like fashion, a number of calculations are generated resulting from multiplying a value with the number of redundant packets (here one) added to a value obtained by subtracting the number of column lost packets (here one) from the number of column packets by the number of rows, and executing these calculations without disturbing the original transmission timing requires recovery processing to be carried out intensively in an extremely short time after the loss is detected.

Packet losses may occur not only by errors in transmission, but also errors in processing on the receiving side, and therefore carrying out processing temporarily in a burst-like fashion increases an influence on other processing (especially processing that follows) on the receiving side, which is not desirable. Especially, high vision class media streaming transmission, which has become feasible with improvement in equipment performance in recent years, carries out transmission at a prodigious bit rate compared to real-time streaming so far, and therefore an idle time during which reception for each packet is processed becomes minimal. Therefore, preventing errors requires the processing to be completed within this idle time and requires an extremely large amount of processing, which has a considerable influence on the overall system configuration. That is, when carrying out high bit rate streaming transmission, a recovery calculation method having little influence such as disturbance on other processing on the receiving side is necessary.

SUMMARY OF THE INVENTION

According to an aspect of the present invention, there is provided with a communication apparatus comprising:

a reception attempting unit configured to attempt to receive a media packet from a network;

a first buffering unit configured to perform buffering of the media packets received by the reception attempting unit;

a FEC packet receiver configured to receive an FEC (Forward Error Correction) packet including redundant data to recover a lost media packet and information which specifies a plurality of media packets associated with the redundant data;

a second buffering unit configured to perform buffering of the FEC packets received by the FEC packet receiver;

a selection unit configured to select the FEC packet from the second buffering unit;

an FEC operation processing unit configured to divide FEC operation processing to be carried out using the redundant data included in selected FEC packet and the media packets related to the redundant data into a plurality of processes and sequentially carry out each process so that one process is carried out every time the reception attempting unit attempts to receive a media packet;

a media packet insertion unit configured to insert a media packet recovered through the FEC operation processing in the first buffering unit; and a media packet delivery unit configured to sequentially deliver the media packets in the first buffering unit to a pre-specified application.

According to an aspect of the present invention, there is provided with a communication method comprising:

attempting to receive a media packet from a network;

storing a received media packet in a first buffering unit performing buffering of the media packets;

receiving an FEC (Forward Error Correction) packet including redundant data to recover a lost media packet and information which specifies a plurality of media packets associated with the redundant data;

storing a received FEC packet in a second buffering unit performing buffering of the FEC packets;

selecting the FEC packet from the second buffering unit;

dividing FEC operation processing to be carried out using the redundant data included in selected FEC packet and the media packets related to the redundant data into a plurality of processes and sequentially carrying out each process so that one process is carried out every time the receiving of a media packet is attempted;

inserting a media packet recovered through the FEC operation processing in the first buffering unit; and sequentially delivering the media packets in the first buffering unit to a pre-specified application.

According to an aspect of the present invention, there is provided with a computer readable medium storing a computer program for causing a computer to execute instructions to perform the steps of:

attempting to receive a media packet from a network;

storing a received media packet in a first buffering unit performing buffering of the media packets;

receiving an FEC (Forward Error Correction) packet including redundant data to recover a lost media packet and information which specifies a plurality of media packets associated with the redundant data;

storing a received FEC packet in a second buffering unit performing buffering of the FEC packets;

selecting the FEC packet from the second buffering unit;

dividing FEC operation processing to be carried out using the redundant data included in selected FEC packet and the media packets related to the redundant data into a plurality of processes and sequentially carrying out each process so that one process is carried out every time the receiving of a media packet is attempted;

inserting a media packet recovered through the FEC operation processing in the first buffering unit; and sequentially delivering the media packets in the first buffering unit to a pre-specified application.

DETAILED DESCRIPTION OF THE INVENTION

Figure 1:
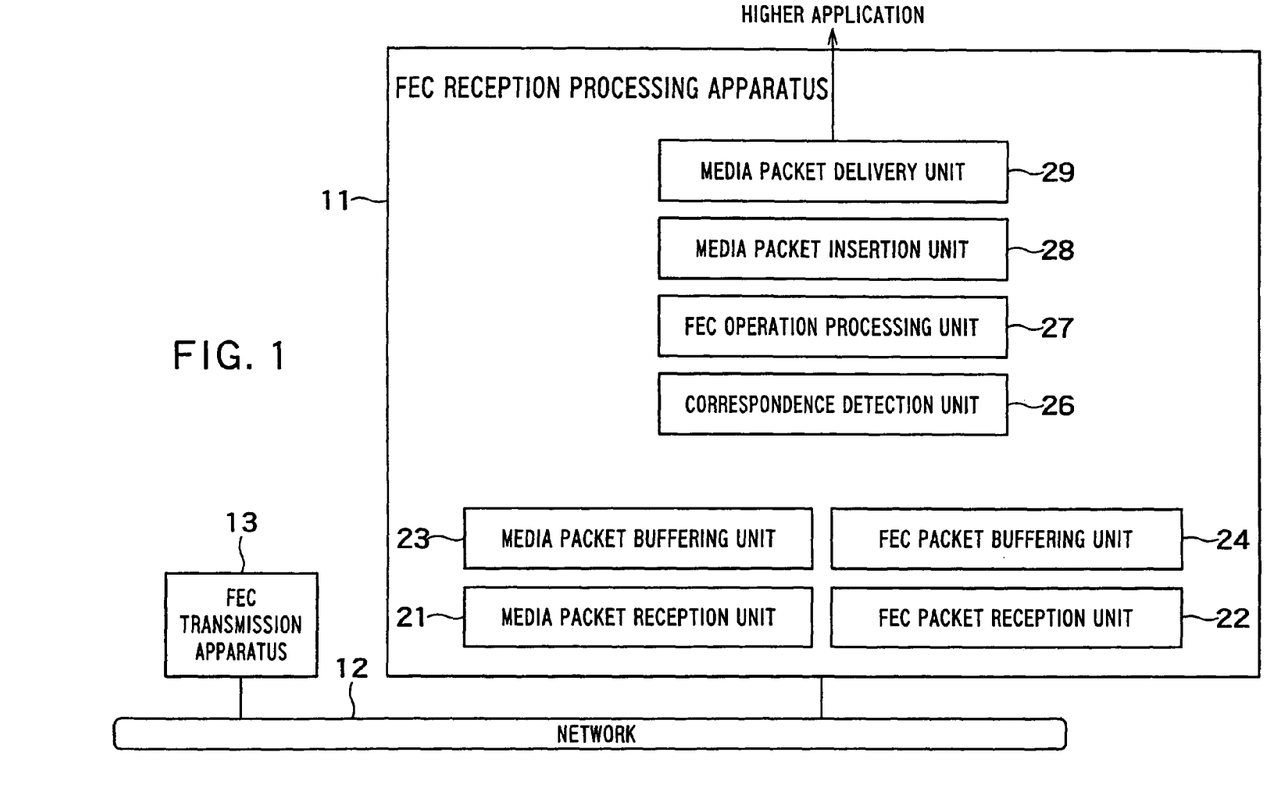
FIG. 1 is a block diagram showing the configuration of an FEC reception processing apparatus according to an embodiment of the present invention.

FIG. 1 is a block diagram showing the configuration of an FEC (Forward Error Correction) reception processing apparatus (communication apparatus) according to a first embodiment of the present invention.

Figure 3:
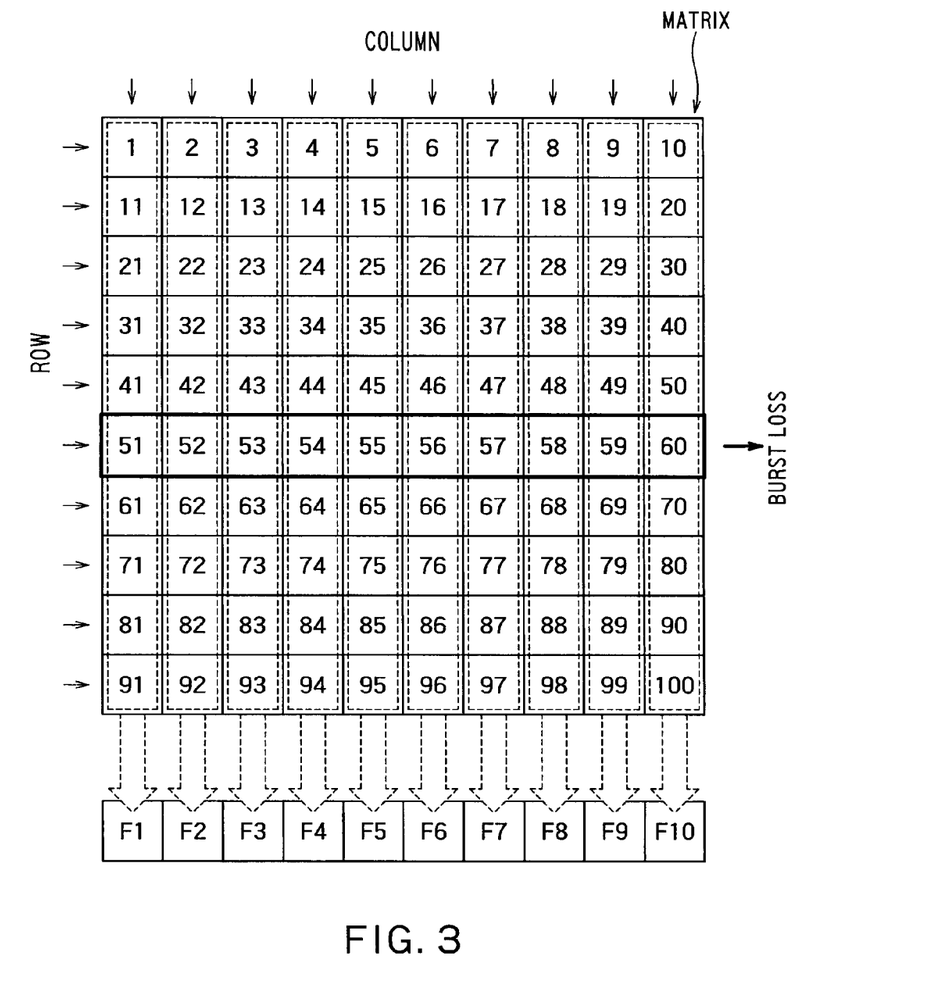
FIG. 3 illustrates the generation of FEC packets.
Figure 4:
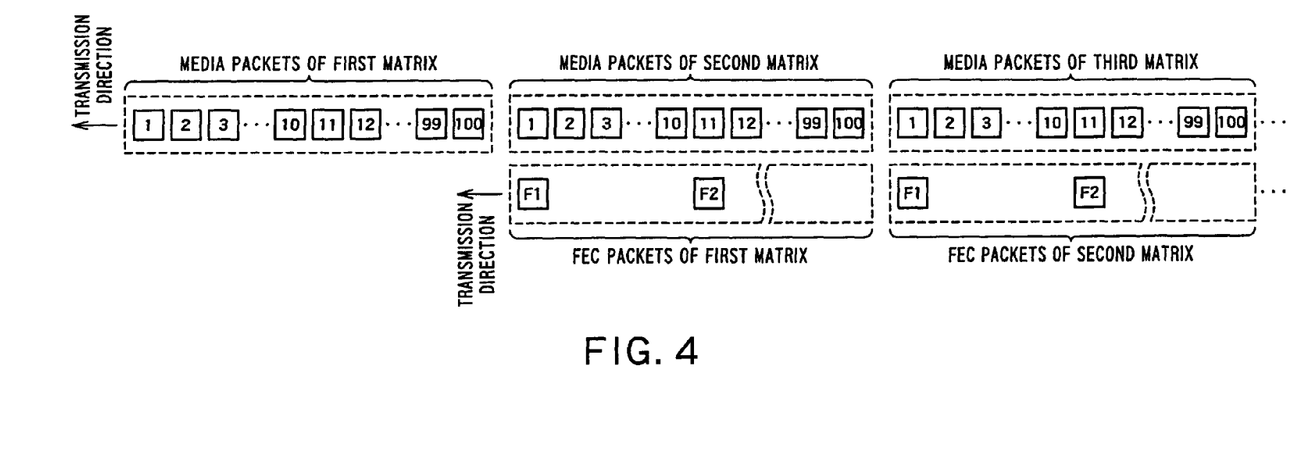
FIG. 4 illustrates transmissions of media packets and FEC packets.

An FEC reception processing apparatus 11 is configured so as to be communicable with an FEC transmission apparatus 13 via a network 12. The FEC transmission apparatus 13 generates media packets including media data to be reproduced on the receiving side and sequence numbers or the like and FEC packets including redundant data for recovering media packets lost on the network 12 or the like and sends those packets to the FEC reception processing apparatus 11 via the network 12. The media packets and the FEC packets are, for example, packets compliant with RTP (Real-time Transport Protocol) and are compliant with RTP in this embodiment. FIG. 3 shows how the FEC transmission apparatus 13 generates FEC packets. FIG. 4 shows how media packets and FEC packets generated by the FEC transmission apparatus 13 are transmitted.

As shown in FIG. 3, the FEC transmission apparatus 13 forms a matrix of a plurality of media packets (this embodiment assumes 100 media packets 1, 2, 3, ... 100. However the present invention is of course not limited to this) arranged in a square form, made up of 10 row groups and 10 column groups. The FEC transmission apparatus 13 calculates redundant data by carrying out an operation (suppose XOR in this embodiment) on a media packet group for each column group and obtains FEC packets F1, F2, F3 ... F10 from each column group using the calculated redundant data. An FEC packet includes, in addition to redundant data, information indicating media packets associated with the redundant data (FEC packet) and sequence numbers which belongs to a system different from that of the media packets. The media packet associated with the redundant data (FEC packet) refers to a media packet from which the redundant data is originated and, for example, the media packets associated with the redundant data of FEC packet F1 are media packets 1, 11, 21, 31, ..., 81, 91. In this embodiment, FEC packets may be generated only from column groups, but FEC packets may be generated also from row groups in addition to column groups.

After generating the FEC packets from the respective column groups, the FEC transmission apparatus 13 sequentially sends media packets 1, 2, 3, 4, ... 99, 100 which belong to the same matrix (suppose a first matrix) at a constant pace (first pace) as shown in FIG. 4 and also sends the respective FEC packets F1, F2, F3, ... F10 simultaneously with transmission of the media packets at a constant pace (second pace). In this embodiment, the respective FEC packets obtained from the first matrix are sent simultaneously with transmission of the media packets of the second matrix. When the transmission of the media packets which belong to the first matrix is completed, the FEC transmission apparatus 13 sequentially sends media packets which belong to the second matrix at the first pace and also sends the respective FEC packets obtained from the second matrix simultaneously with transmission of the media packets. In this embodiment, the respective FEC packets obtained from the second matrix are sent simultaneously with the transmission of the media packets of the third matrix. Suppose the pace between the last media packet of the first matrix and the first media packet of the second matrix is kept to the above described first pace.

When a burst loss occurs on the network 12 and, for example, media packets 51 to 60 are lost as shown in FIG. 3, the receiving side (FEC reception processing apparatus 11) recovers lost packets as follows. That is, the media packet 51 is recovered by XORing the redundant data of the FEC packet F1 and the data of the media packets 1, 11, 21, 31, 41, 61, 71, 81, 91 and the other media packets 52 to 60 are also recovered in the same way.

A media packet reception unit (reception attempting unit) 21 of the FEC reception processing apparatus 11 receives media packets from the FEC transmission apparatus 13 through the network 12 and hands over the received media packets to a buffering unit 23 unless they are illegal packets. More specifically, media packets arriving from the network 12 are temporarily stored, for example, in a pool managed by the OS (Operating System) and the media packet reception unit 21 attempts to receive the media packets (performs a reception operation) from this pool. If the media packets are included in the pool, the media packet reception unit 21 receives the media packets from the pool and hands over the received media packets to the media packet buffering unit 23. If there is no media packet in the pool (resulting in a vain attempt), a reception operation is performed on the pool again after an appropriate time. The media packet buffering unit 23 stores the media packets handed over from the media packet reception unit 21 in an internal buffer. When storing a media packet in the buffer, the media packet buffering unit 23 records a storage time Tin of the media packet.

Examples of illegal media packets include a media packet having the same number as the sequence number of a media packet received immediately before (overlapping packet), a media packet whose recorded time stamp has a value older than an expected value (media packet, reception of which would be meaningless because reproducing timing thereof is already past). Examples also include a media packet having a source identifier different from the source identifier of the current stream, a media packet that has failed in decoding or authentication and these are media packets that should be treated as ones irrelevant to the current stream.

In this way, every time a non-illegal media packet is received, the media packet reception unit 21 hands over the received media packet to the media packet buffering unit 23 and the media packet buffering unit 23 stores the handed media packet in the buffer. In this way, media packets are stored one after another in the media packet buffering unit 23. The media packet buffering unit 23 arranges the media packets in the buffer in ascending order of sequence numbers.

On the other hand, an FEC packet reception unit (FEC packet receiver) 22 of the FEC reception processing apparatus 11 receives FEC packets from the FEC transmission apparatus 13 via the network 12 and hands over these received FEC packets to an FEC packet buffering unit 24 unless they are illegal packets. The FEC packet buffering unit 24 stores the received FEC packets in an internal buffer. The FEC packet buffering unit 24 arranges the FEC packets according to the sequence numbers of the FEC packets.

A correspondence detection unit 26 detects (finds the recovery unit of FEC) a media packet group associated with the FEC packet from header information (information indicating the media packet associated with the FEC packet) of the FEC packet. The detection may also be performed when an FEC packet is stored in the buffer or when error correction processing (FEC operation processing) is performed by an FEC operation processing unit 27.

When an FEC packet exists in the FEC packet buffering unit 24, the FEC operation processing unit 27 reads the FEC packet from the FEC packet buffering unit 24 and carries out error correction processing (FEC operation processing) using the read FEC packet and the media packet inside the media packet buffering unit 23 associated with this FEC packet. As described above, FEC packets are arranged according to their sequence numbers in the FEC packet buffering unit 24, (e.g., ascending order) and the FEC packets are read according to the sequence numbers. The FEC operation processing unit 27 is provided with a selecting unit for selecting FEC packets according to the sequence numbers.

Here, instead of carrying out FEC operation processing all at once, a feature of this embodiment is to divide FEC operation processing into a plurality of operation processes, sequentially carry out the divided processes, one process every time a reception operation by the media packet reception unit 21 is carried out, carry out reception operations corresponding in number to the divided operation processes and thereby complete the FEC operation processing. The FEC operation processing like this is carried out irrespective of the presence/absence of losses of media packets or the number of losses. Hereinafter, the FEC operation processing in this embodiment will be explained taking a case where the FEC packet F1 is associated with the media packets 1, 11, 21, 31, 41, 51, 61, 71, 81, 91 as an example. Here, suppose the media packet 51 is lost on the network 12.

First, when the above described reception operation on the pool managed by the OS is carried out by the media packet reception unit 21, the FEC operation processing unit 27 calculates an XOR between the redundant data of the FEC packet F1 and the media packet 1 (performs first division operation processing) and obtains a first calculation result irrespective of whether media packet is received. Next, when the reception operation on the pool by the media packet reception unit 21 is performed, the FEC operation processing unit 27 calculates an XOR between the first calculation result and the media packet 11 (performs second division operation processing) and obtains a second calculation result. Next, when the reception operation on the pool by the media packet reception unit 21 is performed, the FEC operation processing unit 27 calculates an XOR between the second calculation result and the media packet 21 (performs third division operation processing) and obtains a third calculation result. In this way, division operation processing is carried out every time the reception operation is carried out by the media packet reception unit 21, and a total of 9 reception operations are carried out (note that the media packet 51 is lost), the FEC operation processing is completed and the media packet 51 is thereby recovered. If the media packet 51 is not lost, FEC operation processing is completed through 10 reception operations (in the case, this calculation result is ignored). The FEC operation processing unit 27 performs such FEC operation processing on the other FEC packets F2 to F10 within the same matrix, too.

In this way, this embodiment performs FEC operation processing irrespective of the presence/absence of losses of media packets or the number of losses, carries out one of operation processes resulting from dividing FEC operation processing into a plurality of processes at every timing of reception operation, and thereby distributes FEC operation processing on a maximum of media packets in the matrix size to reception operation timings corresponding to the matrix size. That is, instead of carrying out FEC operation processing all at once after detecting that media packets are lost as in the conventional case, this embodiment carries out FEC operation processing on all media packets irrespective of the presence/absence of losses of media packets and carries out this FEC operation processing by dividing it into a plurality of processes. This prevents the load of FEC operation processing (media packet recovery processing) from suddenly (extremely) increasing and allows the amount of calculation and operation time (FEC operation time) Tp necessary for FEC operation processing to be estimated at constant values beforehand. This will be explained more specifically as follows.

When a periodic operation is needed as in the case of media reproduction, the processing that should be carried out before a periodic operation needs to be completed by a required time, and as a result the periodicity is disturbed. If the amount of processing of the processing that should be carried out before a periodic operation is uniform, the time required for the processing is self-evident and the securing of the periodicity becomes easy. This is especially effective in the case of, for example, built-in equipment which has a calculation capacity corresponding to a predictable amount of processing and carries out a plurality of periodic operations simultaneously. Especially, when the processing that should be performed before a periodic operation has no relationship with the periodic operation, if the amount of processing of the processing in question is not constant, it is difficult to perform scheduling a periodic operation at appropriate timing. Therefore, it is preferable that the amount of operation that should be performed before a periodic operation and the operation time be constant and be known beforehand. In this respect, this embodiment can estimate the amount of operation and the operation time necessary for FEC operation processing at constant values as described above, and can thereby prevent periodic operation such as reproduction of a medium at a subsequent stage of the FEC reception processing apparatus from being disturbed.

A media packet insertion unit 28 of the FEC reception processing apparatus 11 checks whether or not there are lost packets and whether or not the number thereof is one and when the number is one, the media packet insertion unit 28 inserts the recovered media packet which is the calculation result of the FEC operation processing unit 27 at a corresponding position of the buffer in the media packet buffering unit 23. That is, the media packet insertion unit 28 hands over the recovered media packet to the media packet buffering unit 23 and the media packet buffering unit 23 stores the media packet received from the media packet insertion unit 28 at the corresponding position in the internal buffer based on the sequence number of the media packet. In this case, the media packet buffering unit 23 records the storage time Tin of the media packet as "Ti of the packet having the immediately preceding sequence number+reception interval" or "Ti of the packet having the immediately following sequence number−reception interval." As the "reception interval", an interval acquired or set beforehand may be used or an average of reception intervals calculated as will be described later may be used. When the number of lost media packets is two or more, suppose the processing will be continued assuming that the media packets could not be recovered.

A media packet delivery unit 29 of the FEC reception processing apparatus 11 sequentially extracts media packets from the buffer in the media packet buffering unit 23 and delivers them to the higher application. More specifically, the media packet delivery unit 29 compares the current time obtained from a timer (not shown) with the storage time Ti of each media packet and sends media packets to the higher application starting with one whose difference between the current time obtained from the timer and storage time Ti exceeds a preset buffering time (predetermined time) Tb.

This buffer time Tb can be expressed as delay time Ts+FEC operation time Tp. The FEC operation time Tp is a time required for FEC operation processing, and as described above, this embodiment can estimate it at a constant value. The delay time Ts is a time after a first media packet in one matrix arrives (stored in the buffer) until all other media packets and all FEC packets in the same matrix arrive. That is, the delay time Ts is the time required after the first media packet is stored in the buffer until FEC operation processing for the entire matrix can be started. The pace at which each media packet or FEC packet is transmitted from the FEC transmission apparatus 13 is constant as described above, and therefore it is also possible to estimate the delay time Ts at a constant value. The buffer time Tb corresponds to the sum of the pre-estimated delay time Ts and FEC operation time Tp in this way and since the delay time Ts and FEC operation time Tp can also be estimated at constant values, the buffer time Tb can also be estimated at a constant value. The media packet delivery unit 29 delivers the media packet to the higher application with a delay corresponding to this buffer time Tb.

In the above explanation, the buffer time Tb is assumed to be preset, but the buffer time Tb can also be calculated by the FEC operation processing unit 27 as follows.

Suppose the reception time of the last FEC packet received out of FEC packets obtained from a certain matrix is T1, the reception time of the media packet first to arrive out of media packets belonging to the matrix is T0 and the delay time is Ts=T1−T0. Suppose this Ts is the worst value of timing according to the specification at which FEC operation processing is started.

Furthermore, suppose a reception interval of media packets is Tw, a maximum number of reception operations necessary to perform FEC operation processing for one matrix is N and the FEC operation time Tp=Tw×N.

Suppose N is the same as, for example, the matrix size and the matrix size is already known to the transmitting side and the receiving side or stream information is acquired from an HTTP server or using a DESCRIBE method of RTSP and the matrix size is obtained from this stream information.

The reception interval Tw may be (1) preset or may be (2) acquired by measuring reception intervals of media packets and averaging the measured reception intervals.

In the case of (1), the reception interval Tw may be already known to the transmitting side and the receiving side or stream information may be acquired by a separate communication unit from an HTTP server or acquired using a DESCRIBE method of RTSP and the bit rate may be divided by the number of data transfer bytes for each packet and the reception interval of packets may be thereby obtained based on the acquired stream information.

Figure 5:
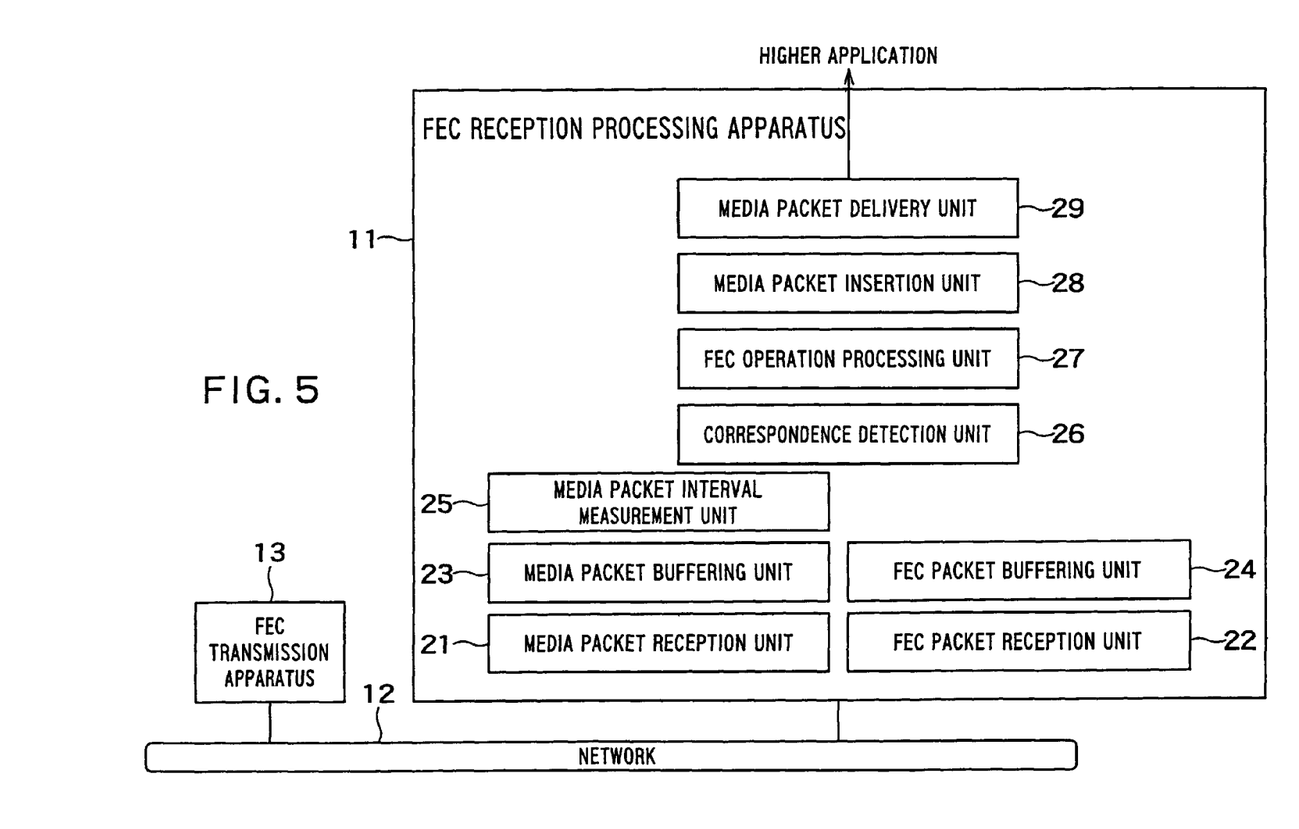
FIG. 5 is a block diagram showing another configuration example of the FEC reception processing apparatus.

In the case of (2), as shown in FIG. 5, the media packet interval measurement unit (reception interval measurement unit) 25 for measuring reception intervals of media packets is added to the FEC reception processing apparatus 11. Every time a media packet is received, the media packet interval measurement unit 25 measures a difference between a storage time Ti of the media packet and a storage time Tin of the immediately preceding media packet stored in the buffer, divides this difference by a difference between the sequence number of the received media packet and the sequence number of the immediately preceding media packet stored in the buffer, thereby calculates the reception interval of media packet and regards its average as a reception interval Tw.

The FEC operation processing unit 27 adds up the delay time Ts calculated in this way and FEC operation time Tp and can thereby obtain a buffer time Tb.

Figure 2:
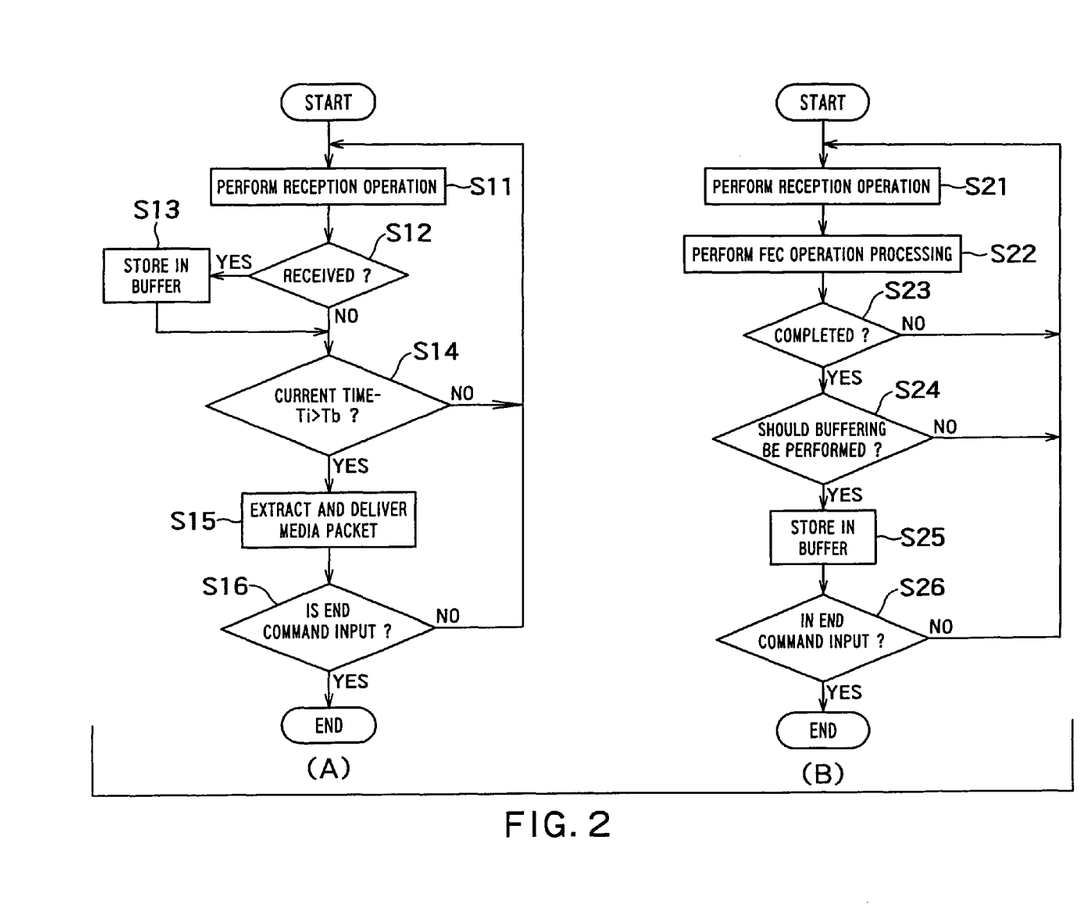
FIG. 2 is a flow chart illustrating the operation of the first embodiment of the present invention.

The FIG. 2(A) and FIG. 2(B) are flow charts illustrating the operation of the FEC reception processing apparatus. Especially FIG. 2(A) shows an operational relationship between the media packet reception unit 21, media packet buffering unit 23 and media packet delivery unit 29, while FIG. 2(B) shows an operational relationship between the media packet reception unit 21, FEC operation processing unit 27 and media packet insertion unit 28.

As shown in FIG. 2(A), the media packet reception unit 21 performs a reception operation attempting to receive a media packet (S11), and when it receives the media packet (YES in S12), the media packet reception unit 21 stores the received media packet in the buffer in the buffering unit 23 (S13). After storing the media packet in the buffer, or when no media packet is received in S12 (NO in S12), the media packet delivery unit 29 checks whether or not there is any media packet whose difference between the current time and storage time Ti exceeds the buffer time Tb (S14), and when such a media packet exists (YES in S14), the media packet delivery unit 29 extracts the media packet from the buffer and sends it to the higher application (S15). After this, it is checked whether or not the user has input an end command (S16), and when such a command is input (YES in S16), the processing ends. When no end command is input (NO in S16) or when there is no media packet whose difference from the current time Ti is Tb or less in S14 (NO in S14), the flow returns to step S11, where the media packet reception unit 21 performs a reception operation.

As shown in FIG. 2(B), when the media packet reception unit 21 performs a reception operation on a media packet (S21), the FEC operation processing unit 27 performs one (not processed yet) of the processes resulting from dividing the FEC operation processing into a plurality of processes (S22). The FEC operation processing unit 27 judges whether or not all of the divided operation processes have been completed, that is, whether or not the FEC operation processing has been completed (S23), and if the FEC operation processing has been completed (YES in S23), it judges whether or not buffering should be carried out (S24). That is, the FEC operation processing unit 27 judges whether or not there are lost packets and whether or not the number thereof is one. If buffering should be carried out (YES in S24), the media packet insertion unit 28 inserts the media packet obtained through the FEC operation processing (recovered media packet) at the corresponding position of the buffer in the media packet buffering unit 23 (S25). After this, it is checked whether or not the user has input an end command (S26), and if an end command is input (YES in S26), the processing is finished. When no end command is input (NO in S26), when it is judged in S23 that the FEC operation processing has not been completed (NO in S23) or when it is judged in S24 that buffering should not be performed (NO in S24), the flow returns to step S21, where the system waits for a reception operation by the media packet reception unit 21.

As described above, this embodiment appropriately sets the delay time Ts (worst value after a first packet in one matrix arrives until all packets necessary for FEC operation processing arrive) with respect to a media packet and FEC packet, distributes the FEC operation processing within an FEC operation time, and can thereby eliminate a sudden increase in the amount of operation processing, incomplete operation processing or wasteful delay times, and can realize temporal smoothing of the amount of operation processing, make the load on the entire system uniform and acquire constancy of the packet delivery period.

The reception processing apparatus in FIG. 1 and FIG. 5 can also be realized, for example, by using a general-purpose computer as basic hardware. That is, the elements 21 to 29 can be realized by causing a processor mounted on the above described computer to execute a program. In this case, the FEC reception processing apparatus may also be realized by pre-installing the above described program in the computer or by storing the program in a storage medium such as a CD-ROM, or distributing the above described program through a network and installing this program in the computer as appropriate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus including a computer, the computer comprising:
   a reception attempting unit implemented by processing circuitry and configured to attempt to receive a media packet from a network;
   a first buffering unit implemented by the processing circuitry and configured to perform buffering of media packets received by the reception attempting unit;
   a FEC packet receiver configured to receive an FEC (Forward Error Correction) packet including both redundant data and information which specifies a plurality of media packets associated with the redundant data;

a second buffering unit implemented by the processing circuitry and configured to perform buffering of FEC packets received by the FEC packet receiver;

a selection unit implemented by the processing circuitry and configured to select one of the FEC packets from the second buffering unit;

an FEC operation processing unit implemented by the processing circuitry and configured to perform FEC operation processing using the redundant data, which is included in the selected one of the FEC packets, and using the media packets related to the redundant data which are present in the first buffering unit to thereby recover a lost media packet in a case that one of the plurality of media packets, related to the redundant data included in the selected FEC packet, is lost, wherein the FEC operation processing unit specifies at least one packet, which has not yet been specified, among the selected FEC packet and the media packets related to the redundant data and carries out a next operation based on the specified packet(s) and a result of a latest operation being the operation which has been most recently carried out before the next operation is carried out, each time the reception attempting unit attempts to receive any media packet from the network, a media packet insertion unit implemented by the processing circuitry and configured to insert a media packet recovered through the FEC operation processing in the first buffering unit; and a media packet delivery unit implemented by the processing circuitry and configured to sequentially deliver the media packets in the first buffering unit to a pre-specified application.

2. The apparatus according to claim 1, wherein the media packet and the FEC packet are compliant with an RTP (Real-time Transport Protocol) protocol.

3. The apparatus according to claim 1, wherein the FEC operation processing unit erases, when the media packets associated with the redundant data is delivered to the application, the FEC packet including the redundant data from the second buffering unit.

4. The apparatus according to claim 1, wherein the operation is an exclusive OR (XOR) operation among the specified packet(s) and the latest operation.

5. The apparatus according to claim 1, wherein when a predetermined time elapses after the first buffering unit obtains the media packet from the reception attempting unit, the media packet delivery unit delivers the media packet to the application.

6. The apparatus according to claim 5, wherein the media packet delivery unit calculates a difference between a reception time of a packet received first out of the FEC packet and the media packets associated with the FEC packet and a reception time of the packet received last, as a delay time, calculates an FEC operation time required for the FEC operation processing by multiplying a media packet reception interval given beforehand by a number of times the FEC operation processing unit specifies said at least different one packet, and sums up the delay time and the FEC operation time to thereby obtain the predetermined time.

7. The apparatus according to claim 6, further comprising a reception interval measurement unit configured to measure reception intervals of the media packets, wherein the media packet delivery unit uses an average of the reception intervals of the media packets measured by the reception interval measurement unit as the media packet reception interval.

8. A communication method for a communication apparatus comprising:

attempting to receive a media packet from a network;

storing a received media packet in a first buffering unit performing buffering of media packets;

receiving an FEC (Forward Error Correction) packet including both redundant data and information which specifies a plurality of media packets associated with the redundant data;

storing a received FEC packet in a second buffering unit performing buffering of FEC packets;

selecting one of the FEC packets from the second buffering unit;

performing FEC operation processing using the redundant data, which is included in the selected one of the FEC packets, and using the media packets related to the redundant data which are present in the first buffering unit to thereby recover a lost media packet in a case that one of the plurality of media packets related to the redundant data included in the selected FEC packet is lost, wherein the FEC operation processing includes specifying at least one different packet, which has not yet been specified, among the selected FEC packet and the media packets related to the redundant data and carrying out a next operation based on the specified packet(s) and a result of a latest operation being the operation which has been most recently carried out before a next operation is carried out, each time a step of the attempting attempts to receive any media packet from the network;

inserting a media packet recovered through the FEC operation processing in the first buffering unit; and sequentially delivering the media packets in the first buffering unit to a pre-specified application.

9. A non-transitory computer readable medium storing a computer program for causing a computer to execute instructions to perform the steps of:

attempting to receive a media packet from a network;

storing a received media packet in a first buffering unit performing buffering of media packets;

receiving an FEC (Forward Error Correction) packet including both redundant data and information which specifies a plurality of media packets associated with the redundant data;

storing a received FEC packet in a second buffering unit performing buffering of FEC packets;

selecting one of the FEC packets from the second buffering unit;

performing FEC operation processing using the redundant data, which is included in the selected one of the FEC packets, and using the media packets related to the redundant data which are present in the first buffering unit to thereby recover a lost media packet in a case that one of the plurality of media packets, related to the redundant data included in the selected FEC packet, is lost, wherein the FEC operation processing includes specifying at least one different packet, which has not yet been specified, among the selected FEC packet and the media packets related to the redundant data and carrying out a next operation based on the specified packet(s) and a result of a latest operation being the operation which has been most recently carried out before the next operation is carried out, each time a step of the attempting attempts to receive any media packet from the network;
inserting a media packet recovered through the FEC operation processing in the first buffering unit; and
sequentially delivering the media packets in the first buffering unit to a pre-specified application.

* * * * *